(12) United States Patent
Yamauchi

(10) Patent No.: US 8,885,225 B2
(45) Date of Patent: Nov. 11, 2014

(54) IMAGE FORMING APPARATUS, IMAGE FORMING METHOD, AND IMAGE FORMING MATERIAL

(75) Inventor: Toshiaki Yamauchi, Kanagawa-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 237 days.

(21) Appl. No.: 13/523,996

(22) Filed: Jun. 15, 2012

(65) Prior Publication Data

US 2012/0327481 A1 Dec. 27, 2012

Related U.S. Application Data

(60) Provisional application No. 61/500,346, filed on Jun. 23, 2011.

(51) Int. Cl.
```
G06K 15/02      (2006.01)
G03G 9/00       (2006.01)
H04N 1/60       (2006.01)
G03G 21/04      (2006.01)
```
(52) U.S. Cl.
CPC *G06K 15/02* (2013.01); *G03G 9/00* (2013.01); *H04N 1/603* (2013.01); *H04N 1/6091* (2013.01); *G03G 21/04* (2013.01)
USPC .......................................... 358/3.28

(58) Field of Classification Search
CPC combination set(s) only.
See application file for complete search history.

(56) References Cited

U.S. PATENT DOCUMENTS

| | | | |
|---|---|---|---|
| 6,203,603 B1 * | 3/2001 | Takayama et al. | 106/31.16 |
| 7,894,092 B2 * | 2/2011 | Kasai et al. | 358/1.15 |
| 2011/0262166 A1 * | 10/2011 | Imamiya | 399/68 |

FOREIGN PATENT DOCUMENTS

JP         10-171198          6/1998

* cited by examiner

*Primary Examiner* — Clayton E LaBalle
*Assistant Examiner* — Victor Verbitsky
(74) *Attorney, Agent, or Firm* — Amin, Turocy & Watson, LLP

(57) ABSTRACT

According to one embodiment, there is provided an image forming apparatus for forming an image on a medium. The image forming apparatus includes a first image forming material including a color material that is decolored at or above a first temperature, and that develops color at or below a second temperature lower than the first temperature, a second image forming material including a color material that is not decolored under heat, a heater that heats the medium to the first temperature or higher after an image is formed on the medium, and a controller that performs control to print an image on the medium using the second image forming material, and to print tracking information on the medium using the first image forming material.

19 Claims, 6 Drawing Sheets

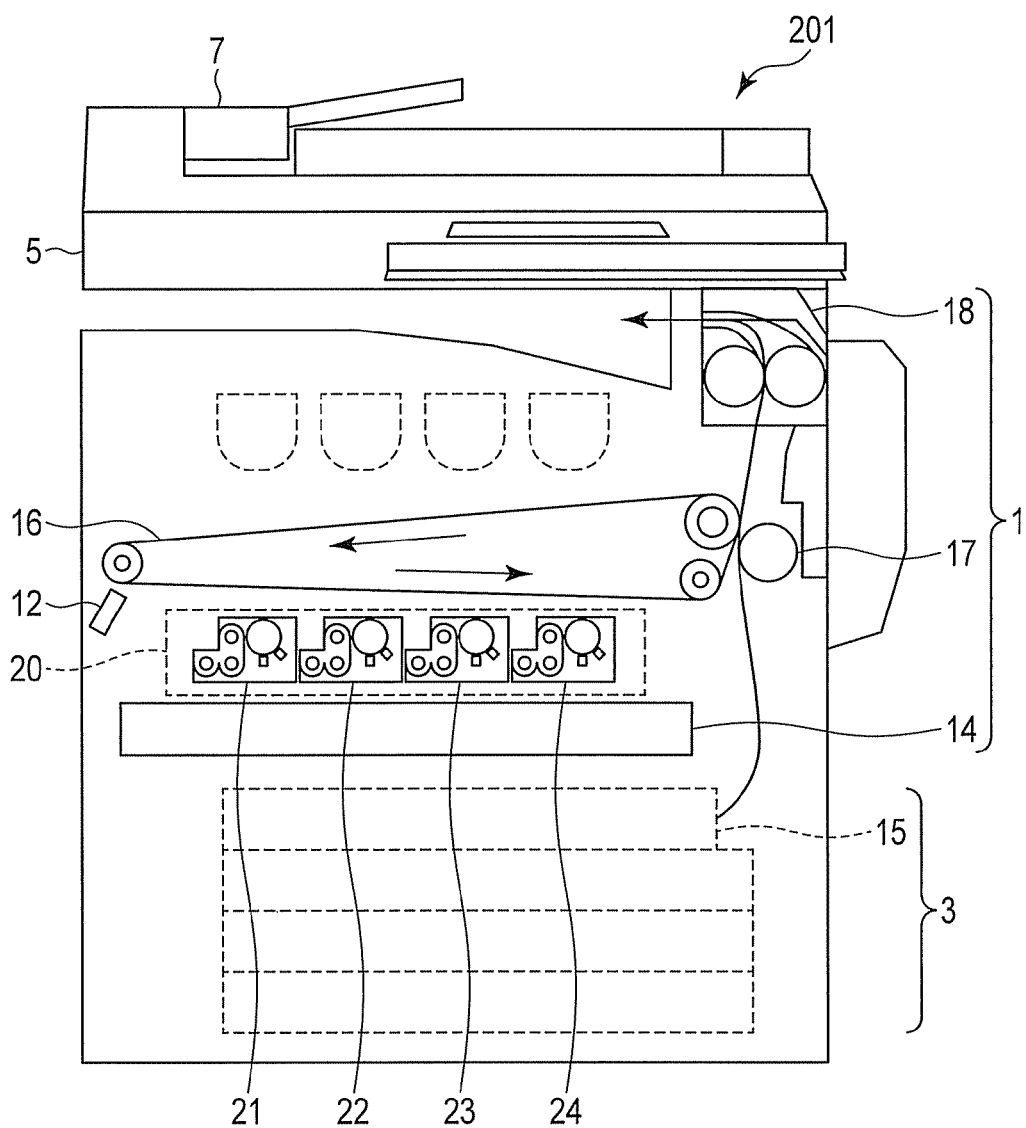
F I G. 2

IMAGE FORMING APPARATUS, IMAGE FORMING METHOD, AND IMAGE FORMING MATERIAL

CROSS-REFERENCE TO RELATED APPLICATIONS

This application is based upon and claims the benefit of U.S. Provisional Application No. 61/500,346, filed on Jun. 23, 2011; the entire contents of which are incorporated herein by reference.

FIELD

Embodiments described herein relate generally to image forming apparatuses, image forming methods, and image forming materials.

BACKGROUND

Use of image forming apparatuses such as an MFP (Multi Function Peripheral) enables various kinds of information to be conveniently output in hardcopy, including document copies, facsimile outputs, and printing of PC information. On the other hand, there is a concern over information security for the prevention of forgery and leakage of confidential information.

To this end, there are proposed various information tracking techniques using background printing and monochromatic yellow printing. In one technique, for example, documents are created by background printing, and output information (e.g., output machine number, date and time, and user name) is visualized when the documents are copied. Other techniques include embedding output information in a combination of printed dots, and writing information in documents in a difficult-to-perceive color such as monochromatic yellow.

The attribute information concerning, for example, apparatus and print job, written as secret information in a document is called tracking information.

However, information tracking using techniques such as background printing and monochromatic yellow printing is problematic, because the information is written into a document in visible form, and thus lowers the output image quality. Such deterioration of output image quality can be prevented by lowering the visibility and hiding the information. However, this is also problematic, because the information detection requires a special device.

In MFPs, it is common practice to use the back side of paper, perform double-side printing, and use recycled paper, in order to save paper in consideration of the increasing environmental awareness for protecting the forest resources supplying paper, and reducing the $CO_2$ emission. Further, in MFPs, methods are known that enable paper to be used repeatedly. This is achieved, for example, by mechanically or chemically detaching the image forming material (for example, toner) from paper, or by printing with a decolorizable toner that is decolored by heat, light, or chemicals.

Embodiments described herein are thus concerned with a technique for writing tracking information using an image forming material, such as a toner and an ink, that contains a color material that can be decolored under heat, and that can redevelop color upon cooling.

BRIEF DESCRIPTION OF THE DRAWINGS

FIG. 2 is an exemplary schematic diagram of the image forming apparatus of First Embodiment.

DETAILED DESCRIPTION

In general, according to one embodiment, an image forming apparatus for forming an image on a medium includes a first image forming material including a color material that is decolored at or above a first temperature, and that develops color at or below a second temperature lower than the first temperature, a second image forming material including a color material that is not decolored under heat, a heater that heats the medium to the first temperature or higher after an image is formed on the medium, and a controller that performs control to print an image on the medium using the second image forming material, and to print tracking information on the medium using the first image forming material.

First Embodiment

An MFP (Multi Function Peripheral; an electrophotographic image forming apparatus) is described below as an example of the image forming apparatus of an embodiment. An MFP is a digital multifunction device that incorporates and utilizes the functionality of various office machines. Included among such functions are scanning an image in a specific resolution and a paper size for reading and copying, receiving images via facsimile, receiving images via e-mail, and receiving print images in a network.

Figure 1:
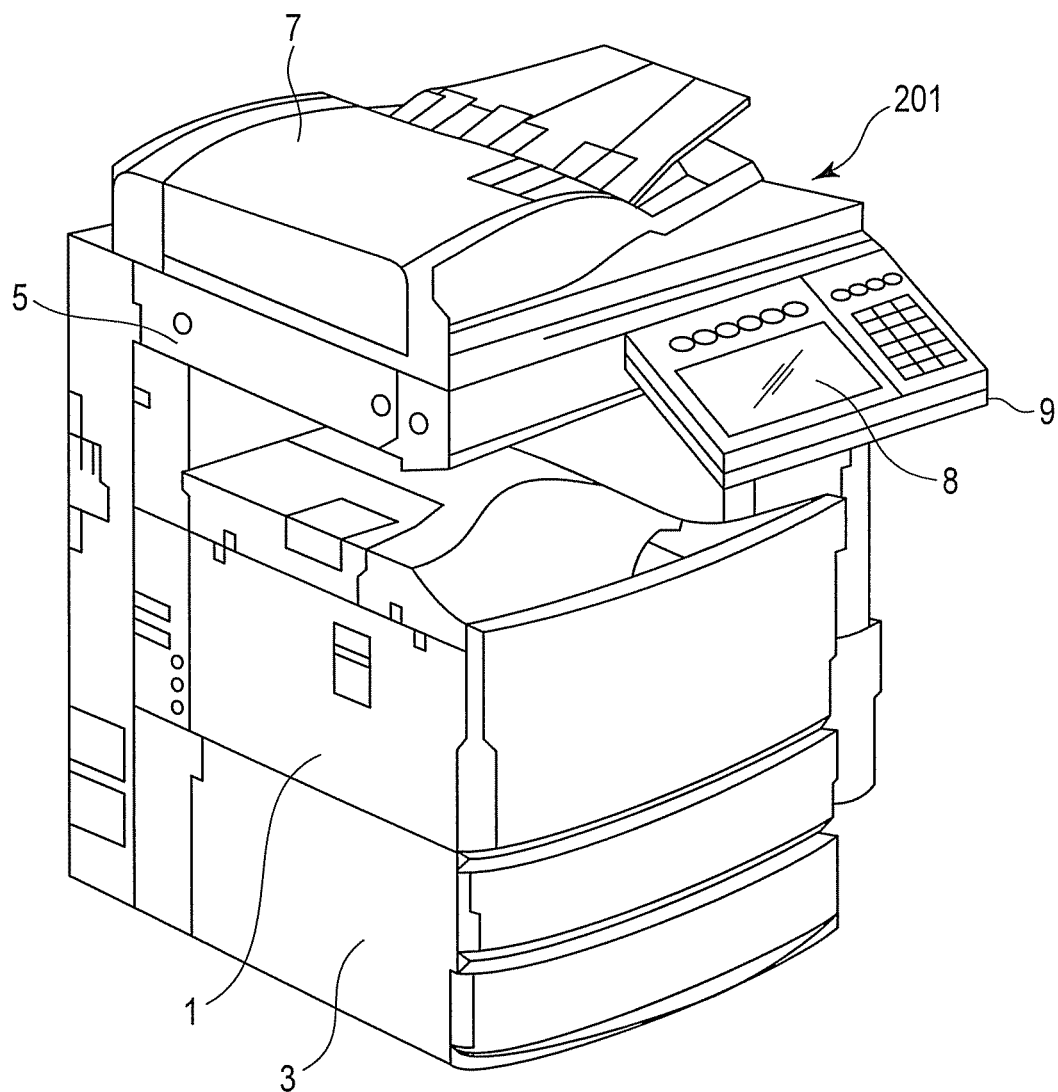
FIG. 1 is an exemplary perspective view schematically illustrating the shape of an image forming apparatus of First Embodiment.

FIG. 1 is an exemplary perspective view schematically illustrating the shape of an image forming apparatus of First Embodiment.

An MFP 201 includes a print unit 1, a paper tray 3, a scan unit 5, an autofeed unit 7, and an operation panel 9.

The print unit 1 outputs image information as an output image called, for example, a hard copy or a print out. The paper tray 3 supplies a medium, specifically, a paper of a given size used for image output, to the print unit 1. The scan unit 5 captures image information from a document as image data. The autofeed unit 7 sends a document finished with reading from the read position to the discharge position, and guides the next document to the read position. The operation panel 9 represents an instruction input section for giving instructions for the operation of the MFP 201, including starting image formation at the print unit 1, and starting the reading of document image information at the scan unit 5. The operation panel 9 includes a display section 8, realized by a display such as an LCD (Liquid Crystal Device), used to enter instructions and display information to an operator.

The MFP 201 may be connected to a network or communication lines (not illustrated) to receive image data via facsimile, e-mail, and the like.

The image forming operation of the image forming apparatus is described below.

FIG. 2 is an exemplary schematic diagram of the image forming apparatus of First Embodiment. The MFP 201 is an image forming apparatus that uses a multiple-series tandem process. The MFP 201 includes a multiple-series tandem process 20, a blade 12 (toner removing section), a control unit 14, a feeding unit 15, a primary transfer belt 16, a secondary transfer roller 17, and a fixing device 18. The multiple-series tandem process 20 includes four process units 21, 22, 23, and 24.

Figure 3:
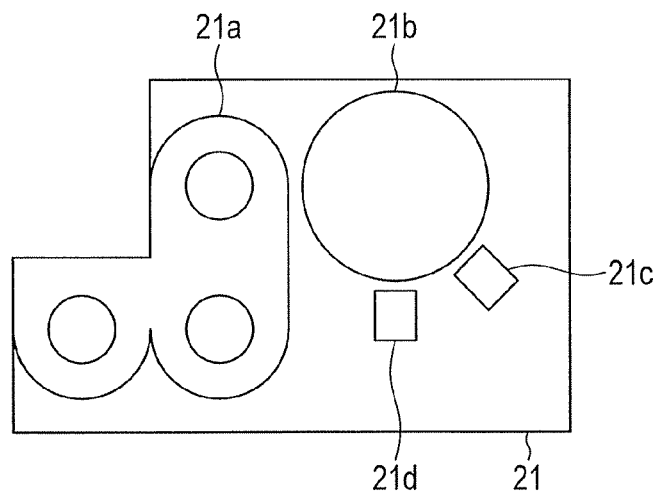
FIG. 3 is a schematic diagram illustrating an example of a structure of a process unit of the image forming apparatus of First Embodiment.

FIG. 3 is an exemplary diagram illustrating an example of a structure of a process unit 21 of the image forming apparatus of First Embodiment. The process unit 21 includes a developing section 21*a*, a photoconductive drum 21*b*, a charging section 21*c*, and an exposure section 21*d*.

In the process unit 21, the photoconductive drum 21*b* (image carrier) is charged to a predetermined potential by the charging section 21*c*, and the exposure unit 21*d* irradiates a laser beam intensity-modulated according to the image information. As a result, an electrostatic latent image corresponding to the output image is formed on the photoconductive drum 21*b*. The electrostatic latent image formed on the photoconductive drum 21*b* is developed with the toner selectively supplied with the magnetic brush of the developing section 21*a*. The developed toner on the photoconductive drum 21*b* is then transferred onto the primary transfer belt 16 in an electric field. Note that the process unit 21, described here as being a cleaner-less unit, is not limited to this, and may include a cleaner. The other process units 22, 23, and 24 are structured and operate in the same way.

The process units 21, 22, 23, and 24 use a yellow (Y) toner, a magenta (M) toner, a cyan (C) toner, and a decolorizable toner.

The decolorizable toner can undergo a reversible color-decolor reaction, whereby, for example, the toner is decolored at room temperature, and develops color as the temperature decreases to a specific color restoring temperature or less. Details will be described later.

In the MFP 201 illustrated in FIG. 2, the toner of each color is transferred to the primary transfer belt 16 after the image forming process at the process units 21, 22, 23, and 24. This is followed by feeding a paper, a secondary transfer by the secondary transfer roller 17, and fixing by the fixing device 18, before the paper is discharged from the MFP 201.

Figure 4:
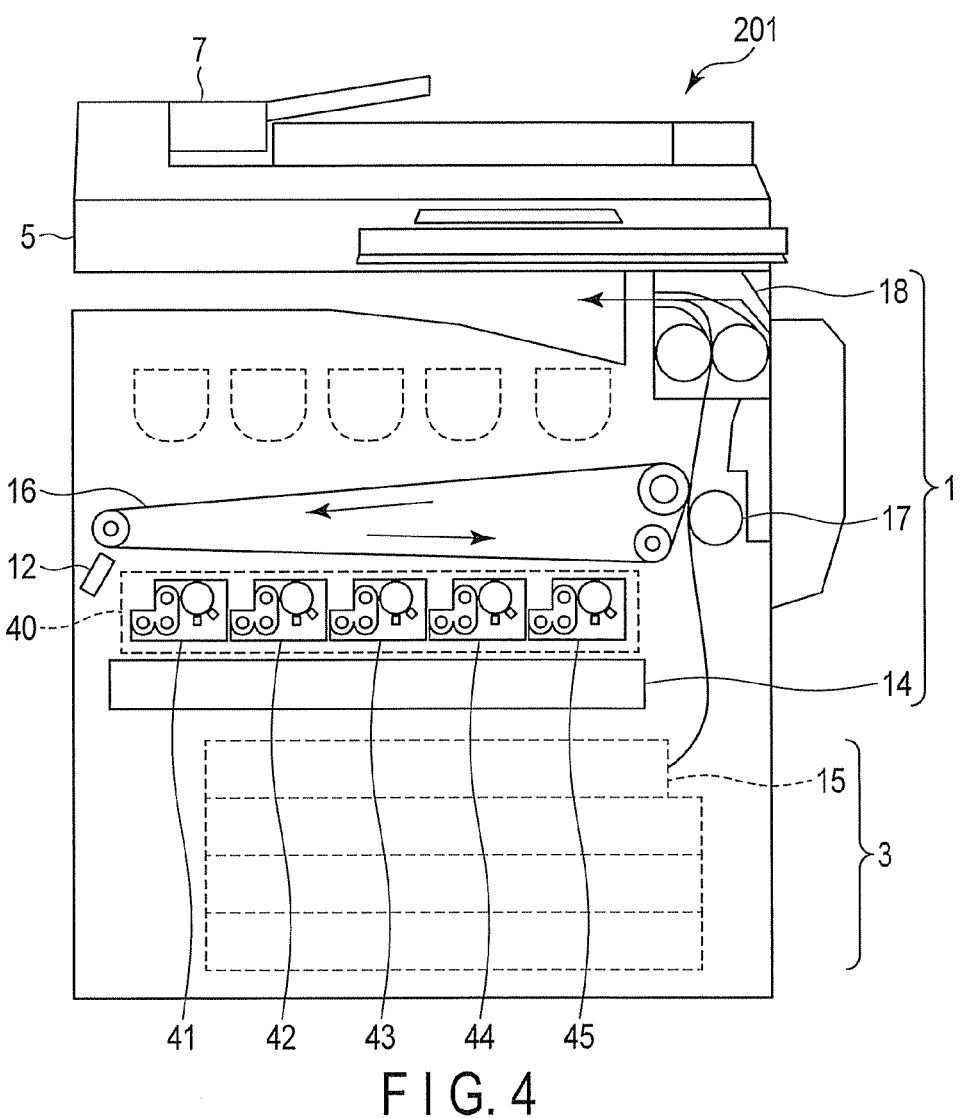
FIG. 4 is another exemplary schematic diagram of the image forming apparatus of First Embodiment.

The structure of the MFP 201 is not limited to that illustrated in FIG. 2, and the MFP 201 may be structured as illustrated in FIG. 4. The MFP 201 illustrated in FIG. 4 includes a multiple-series tandem process 40, instead of the multiple-series tandem process 20. The multiple-series tandem process 40 is structured to include, for example, a process unit 41 that uses a decolorizable toner, and process units 42, 43, 44, and 45 that use non-decolorizable toners of four colors (Y, M, C, K).

The color material (decolorizable toner) used in the MFP of the embodiment is described below.

The color material used is not particularly limited, as long as it has the mechanism to undergo decolorization with increasing temperatures under heat and to regain color upon cooling. Leuco dyes are commonly used as the well-known color material, and are appropriately combined with other materials such as a color developing agent, a decoloring agent, and a discoloration temperature adjuster to select a configuration with which the color disappears at or above a certain temperature and is regained at or below a certain temperature.

The following describes a color forming compound such as a leuco dye, along with a color developing agent and a decoloring agent.

The leuco dye is an electron-donating compound that can develop color with the color developing agent. Examples of the leuco dye include diphenylmethane phthalides, phenylindolyl phthalides, indolyl phthalides, diphenylmethane azaphthalides, phenylindolyl azaphthalides, fluorans, styrylquinolines, and diazarhodamine lactones.

Specific examples include 3,3-bis(p-dimethylaminophenyl)-6-dimethylaminophthalide, 3-(4-diethylaminophenyl)-3-(1-ethyl-2-methylindol-3-yl)phthalide, 3,3-bis(1-n-butyl-2-methylindol-3-yl)phthalide, 3,3-bis(2-ethoxy-4-diethylaminophenyl)-4-azaphthalide, 3-(2-ethoxy-4-diethylaminophenyl)-3-(1-ethyl-2-methylindol-3-yl)-4-azaphthalide, 3-[2-ethoxy-4-(N-ethylanilino)phenyl]-3-(1-ethyl-2-methylindol-3-yl)-4-azaphthalide, 3,6-diphenylaminofluoran, 3,6-dimethoxyfluoran, 3,6-di-n-butoxyfluoran, 2-methyl-6-(N-ethyl-N-p-tolylamino) fluoran, 2-N,N-dibenzylamino-6-diethylaminofluoran, 3-chloro-6-cyclohexylaminofluoran, 2-methyl-6-cyclohexylaminofluoran, 2-(2-chloroanilino)-6-di-n-butylaminofluoran, 2-(3-trifluoromethylanilino)-6-diethylaminofluoran, 2-(N-methylanilino)-6-(N-ethyl-N-p-tolylamino)fluoran, 1,3-dimethyl-6-diethylaminofluoran, 2-chloro-3-methyl-6-diethylaminofluoran, 2-anilino-3-methyl-6-diethylaminofluoran, 2-anilino-3-methyl-6-di-n-butylaminofluoran, 2-xylidino-3-methyl-6-diethylaminofluoran, 1,2-benz-6-diethylaminofluoran, 1,2-benz-6-(N-ethyl-N-isobutylamino) fluoran, 1,2-benz-6-(N-ethyl-N-isoamylamino)fluoran, 2-(3-methoxy-4-dodecoxystyryl)quinoline, spiro[5H-(1) benzopyrrano(2,3-d)pyrimidine-5,1'(3'H)isobenzofuran]-3'-one, 2-(diethylamino)-8-(diethylamino)-4-methyl-, spiro [5H-(1)benzopyrrano(2,3-d)pyrimidine-5,1'(3'H) isobenzofuran]-3'-one, 2-(di-n-butylamino)-8-(di-n-butylamino)-4-methyl-, spiro[5H-(1)benzopyrrano(2,3-d) pyrimidine-5,1'(3'H)isobenzofuran]-3'-one, 2-di-n-butylamino)-8-(diethylamino)-4-methyl-, spiro[5H-(1) benzopyrrano(2,3-d)pyrimidine-5,1'(3'H)isobenzofuran]-3'-one, 2-(di-n-butylamino)-8-(N-ethyl-N-1-amylamino)-4-methyl-, spiro[5H-(1)benzopyrrano(2,3-d)pyrimidine-5,1' (3'H)isobenzofuran]-3'-one, 2-(di-n-butylamino)-8-(di-n-butylamino)-4-phenyl, 3-(2-methoxy-4-dimethylaminophenyl)-3-(1-butyl-2-methylindol-3-yl)-4,5, 6,7-tetrachlorophthalide, 3-(2-ethoxy-4-diethylaminophenyl)-3-(1-ethyl-2-methylindol-3-yl)-4,5,6, 7-tetrachlorophthalide, and 3-(2-ethoxy-4-diethylaminophenyl)-3-(1-pentyl-2-methylindol-3-yl)-4,5,6, 7-tetrachlorophthalide. Other examples include pyridine-, quinazoline-, and bisquinazoline-based compounds. These may be used as a mixture of two or more.

The color developing agent used in the embodiment is an electron-accepting compound that donates a proton to the leuco dye. Examples of the color developing agent include phenols, phenol metal salts, carboxylic acid metal salts, aromatic carboxylic acids, aliphatic carboxylic acids of 2 to 5 carbon atoms, benzophenones, sulfonic acids, sulfonates, phosphoric acids, phosphoric acid metal salts, acidic phosphoric acid esters, acidic phosphoric acid ester metal salts, phosphorous acids, phosphorous acid metal salts, monophenols, polyphenols, 1,2,3-triazole, and derivatives thereof, either unsubstituted or substituted with substituents such as an alkyl group, an aryl group, an acyl group, an alkoxycarbonyl group, a carboxy group, esters of these, an amide group, and a halogen group. Other examples include bis-, tris-phenols, phenol-aldehyde condensate resins, and metal salts of these. These may be used as a mixture of two or more.

Specific examples include phenol, o-cresol, tert-butylcatechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, benzyl p-hydroxybenzoate, dihydroxybenzoic acid and an ester thereof (for example, 2,3-dihydroxybenzoic acid, and methyl 3,5-dihydroxybenzoate), resorcin, gallic acid, dodecyl gallate, ethyl gallate, butyl gallate, propyl gallate, 2,2-bis(4-hydroxyphenyl)propane, 4,4-dihydroxydiphenylsulfone, 1,1-bis(4-hydroxyphenyl)ethane, 2,2-bis(4-hydroxy-3-methylphenyl)propane, bis(4-hydroxyphenyl)sulfide, 1-phenyl-1,1-bis(4-hydroxyphenyl)ethane, 1,1-bis(4-hydroxyphenyl)-3-methylbutane, 1,1-bis(4-hydroxyphenyl)-2-methylpropane, 1,1-bis(4-hydroxyphenyl)n-hexane, 1,1-bis(4-hydroxyphenyl)n-heptane, 1,1-bis(4-hydroxyphenyl)n-octane, 1,1-bis(4-hydroxyphenyl)n-nonane, 1,1-bis(4-hydroxyphenyl)n-decane, 1,1-bis(4-hydroxyphenyl)n-dodecane, 2,2-bis(4-hydroxyphenyl)butane, 2,2-bis(4-hydroxyphenyl)ethylpropionate, 2,2-bis(4-hydroxyphenyl)-4-methylpentane, 2,2-bis(4-hydroxyphenyl)hexafluoropropane, 2,2-bis(4-hydroxyphenyl)n-heptane, 2,2-bis(4-hydroxyphenyl)n-nonane, 2,4-dihydroxyacetophenone, 2,5-dihydroxyacetophenone, 2,6-dihydroxyacetophenone, 3,5-dihydroxyacetophenone, 2,3,4-trihydroxyacetophenone, 2,4-dihydroxybenzophenone, 4,4'-dihydroxybenzophenone, 2,3,4-trihydroxybenzophenone, 2,4,4'-trihydroxybenzophenone, 2,2',4,4'-tetrahydroxybenzophenone, 2,3,4,4'-tetrahydroxybenzophenone, 2,4'-biphenol, 4,4'-biphenol, 4-[(4-hydroxyphenyl)methyl]-1,2,3-benzenetriol, 4-[(3,5-dimethyl-4-hydroxyphenyl)methyl]-1,2,3-benzenetriol, 4,6-bis[(3,5-dimethyl-4-hydroxyphenyl)methyl]-1,2,3-benzenetriol, 4,4'-[1,4-phenylenebis(1-methylethylidene)bis(benzene-1,2,3-triol)], 4,4'-[1,4-phenylenebis(1-methylethylidene)bis(1,2-benzenediol)], 4,4',4''-ethylidenetrisphenol, 4,4'-(1-methylethylidene)bisphenol, and methylene tris-p-cresol.

The decoloring agent used in the embodiment may be a known decoloring agent, provided that it can erase color by inhibiting the chromogenic reaction between the leuco dye and the color developing agent under heat in the three-component system of the color forming compound, the color developing agent, and the decoloring agent.

The decoloring agent may be one with a color-decolor mechanism utilizing the temperature hysteresis of the decoloring agent known from, for example, JP-A-60-264285, JP-A-2005-1369, and JP-A-2008-280523, because such a mechanism has superior instantaneous erasability.

Figure 5:
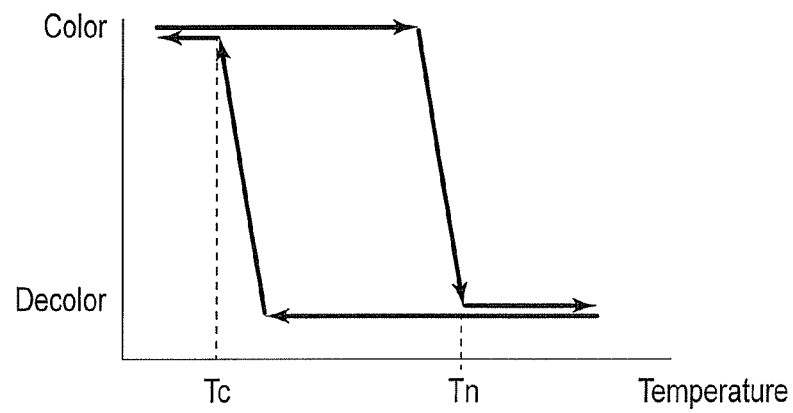
FIG. 5 is an exemplary diagram representing a temperature characteristic of a decolorizable toner used in the image forming apparatus of First Embodiment.

FIG. 5 is an exemplary diagram representing a temperature characteristic of a decolorizable toner used in the image forming apparatus of First Embodiment.

The color of the decolorizable toner can be erased by being heated to a temperature equal to or greater than a specific decoloration temperature Th. The decolored state can be maintained even after the decolored mixture is cooled down to Th or less. Upon lowering the temperature further, a reversible color-decolor reaction can take place, whereby the chromogenic reaction between the leuco dye and the color developing agent is restored at or below a specific color restoring temperature Tc to return to the colored state. Preferably, the decoloring agent used in the embodiment satisfies the relation Th>Tr>Tc, where Tr is room temperature.

Examples of decoloring agents that can exhibit such temperature hysteresis include alcohols, esters, ketones, ethers, and acid amides.

Of these, esters are particularly preferred. Specific examples include carboxylic acid esters that contain a substituted aromatic ring; esters of unsubstituted aromatic ring-containing carboxylic acid and aliphatic alcohol; carboxylic acid esters that contain a cyclohexyl group within the molecule; esters of fatty acid and unsubstituted aromatic alcohol or phenol; esters of fatty acid and branched aliphatic alcohol; esters of dicarboxylic acid and aromatic alcohol or branched aliphatic alcohol; dibenzyl cinnamate; heptyl stearate; didecyl adipate; dilauryl adipate; dimyristyl adipate; dicetyl adipate; distearyl adipate; trilaurin; trimyristin; tristearin; dimyristin; and distearin. These may be used as a mixture of two or more.

The type of material, and the image forming technique are not particularly limited, as long as information for information tracking can be additionally printed using the image forming material containing a heat erasable/cold colorizable color material. The image forming material may be a toner of the electrophotographic system, or an ink of the inkjet system.

The mainstream MFP is one that employs the electrophotographic heat fixing system that uses a heat roller or the like. This type of MFP may be used as a system that additionally includes a developing device containing a toner for printing tracking information (may be a simple small developing device), or that additionally includes an inkjet head for tracking information printing on the preceding stage of a fixing device.

The type of electrophotographic toner resin is not particularly limited, and, for example, resins such as polyester resin, polystyrene resin, styrene/acrylate copolymer resin, polyester-styrene/acrylate hybrid resin, epoxy resin, and polyether-polyol resin may be used.

Other materials, including, for example, natural waxes such as rice wax and carnauba wax; petroleum waxes such as paraffin wax; and synthetic waxes such as fatty acid ester, fatty acid amide, low-molecular polyethylene, and low-molecular polypropylene may be added to the binder resin, as required. Further, various CCAs (Charge Control Agents) may be added to adjust the charge.

The methods and machines used to produce the toner are not particularly limited either. In common toner producing methods, materials such as resin and color material are uniformly mixed, kneaded, and cooled, and then pulverized and classified to obtain a predetermined size. Alternatively, chemical methods may be used in which the constituting material microparticles are emulsified and dispersed in water, and aggregated to produce toner particles, which are then heat fused, filtered and dried.

Toner particles of about 4 to 20 μm produced as above may be used after adding and mixing additives such as silica, titanium oxide, alumina, and metal soap, as required, using a mixer such as a Henschel mixer.

EXAMPLE 1

<Production of Encapsulated Erasable Color Microparticles>
3-(2-Ethoxy-4-diethylaminophenyl)-3-(1-ethyl-2-methylindol-3-yl)-4-azaphthalide (leuco dye; 1 part), 2,2-bis(4-hydroxyphenyl)hexafluoropropane (color developing agent; 5 parts), and a diester compound of pimelic acid and 2-(4-benzyloxyphenyl)ethanol (decoloring agent; 50 parts) were dissolved under heat, and mixed with an aromatic polyvalent isocyanate prepolymer (encapsulating agent; 20 parts), and ethyl acetate (40 parts). The solution was charged into an 8% polyvinyl alcohol aqueous solution (250 parts) to emulsify and disperse the components, and was continuously stirred at 90° C. for about 1 hour. Thereafter, a water-soluble aliphatic modified amine (reactant; 2 parts) was added, and the mixture was further stirred for about 3 hours at the maintained liquid temperature of 90° C. to obtain colorless capsule particles. The capsule particle dispersion was placed in a freezer to develop color, and dried after solid-liquid separation to obtain blue color particles A. The color particles A had a volume average particle diameter of 2 μm, as measured with the Shimadzu SALD 7000. The complete decoloration temperature Th was 79° C., and the complete coloration temperature Tc−10° C.

<Production of Toner Particles>
Toner Formulation 1:

| Polyester resin A (Tg 55° C.) | 85 weight parts |
| Rice wax | 5 weight parts |
| Color particles A | 10 weight parts |

The materials of the formulation above were weighed, uniformly mixed using a Henschel mixer, and kneaded with a biaxial kneader set to 80° C. The kneaded toner composition was cooled with a belt cooler, and coarsely pulverized to 2 mm or less using a hammer mill. Particles with an average particle diameter of 8 μm were then produced through an airborne pulverizer and classifier. Further, hydrophobic silica (2 weight parts), and titanium oxide (0.5 weight parts) were added, and mixed with the particles using a Henschel mixer. Toner was then obtained through a #200 mesh sieve. Because the toner is decolored by the heat of the kneading, the color was redeveloped by storing the toner in a −20° C. freezer for 2 days.

The toner was mixed with a silicone resin-coated ferrite carrier, and placed in a K developing device (Toshiba Tec MFP, e-Studio 4520C). After outputting an ordinary image with ordinary toners placed in YMC developing devices, tracking information was printed on the back side of the paper in a double-side print mode using the heat decolorizable/cold colorizable toner placed in the K developing device. The temperature of the fixing device in the MFP was set to 150° C.

The image density of the portion with the written tracking information was 0.08, as measured with a Macbeth densitometer RD-918. Upon redeveloping the color by cooling the image in a −20° C. freezer, the tracking information became clearly visible. The measured image density was 0.50.

<Production of Non-Decolorizable Toner>
Four toner particle materials of Y, M, C, and B of the following composition were prepared.
Toner Particle Material Composition

| Binder resin (polyester resin): | 92 weight parts |
| Coloring agent: | 5 weight parts |
| Wax (propylene wax): | 2 weight parts |
| Charge control agent (quaternary ammonium salt): | 1 weight part |

Four coloring agents, fast yellow G (Y coloring agent), carmine F (M coloring agent), phthalocyanine blue (C coloring agent), and acetylene black (B coloring agent), were used to obtain toner particle materials of four colors.

The toner particle materials of yellow, magenta, cyan, and black were mixed using a Henschel mixer, and melted and kneaded with a biaxial extruder. The resulting melted and kneaded product was cooled, coarsely pulverized with a hammer mill, and finely pulverized with a jet pulverizer. After classification, toner particles of four colors having a volume average diameter of 8.0 μm were obtained.

The toner particles of four colors were each mixed with silicon dioxide (primary particle diameter, 12 nm; 0.3 weight parts), and titanium dioxide (primary particle diameter, 20 nm; 0.3 weight parts). Further, zinc stearate (metal soap) was added to the magenta toner particles, the cyan toner particles, and the black toner particles, 0.01 weight parts each. The metal soap was not added to the yellow toner particles. The toner particles were then mixed using a Henschel mixer to produce toners of four colors. Each toner (6 weight parts) was mixed with a silicone coat carrier (94 weight parts) to produce developers of four colors.

The color developers produced as above were used as the YMC of FIG. 2, or as the YMCK of FIG. 4.

The following describes writing of tracking information using the toners.

Figure 6:
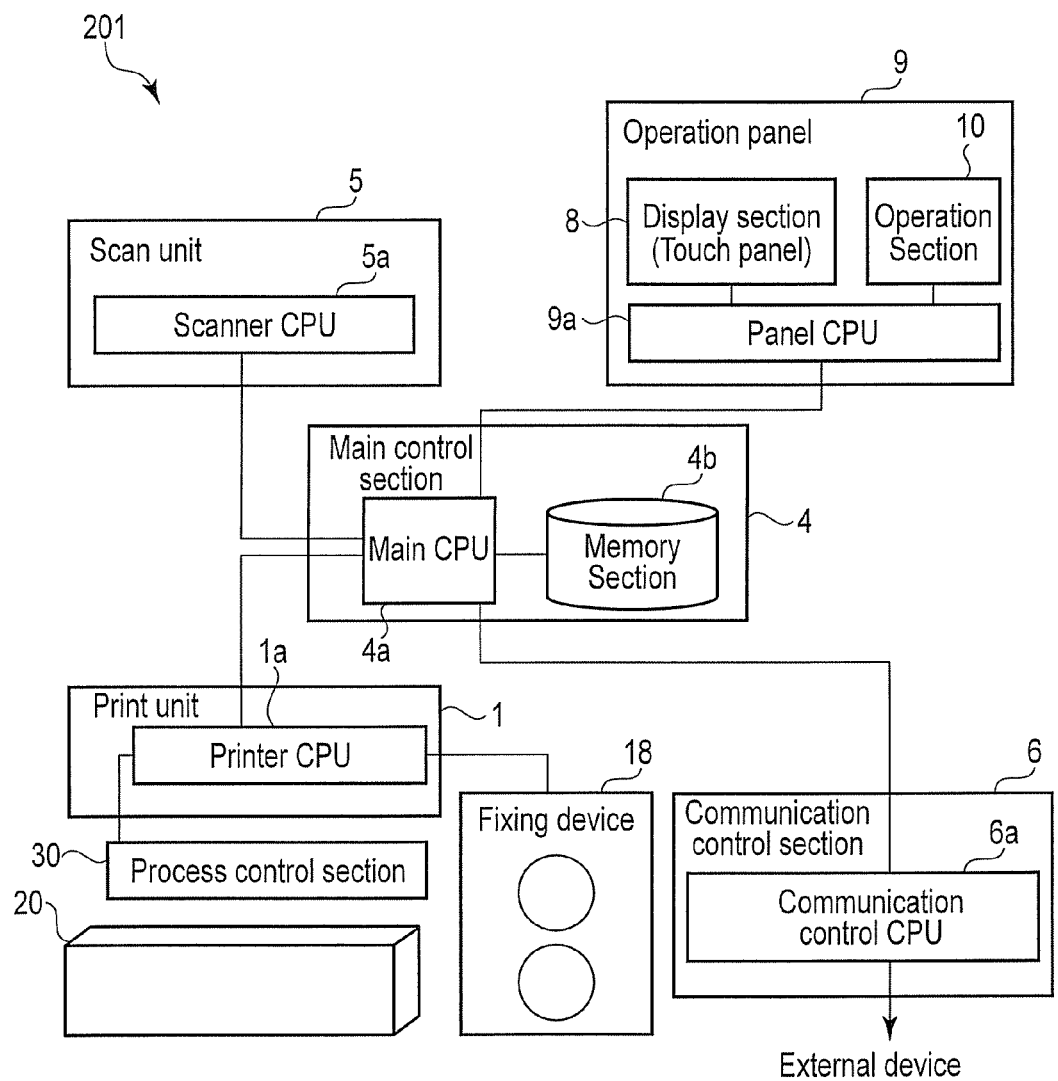
FIG. 6 is an exemplary diagram representing a configuration of a control system of the image forming apparatus of First Embodiment.

FIG. 6 is an exemplary diagram representing a configuration of a control system of the image forming apparatus of First Embodiment.

The MFP 201 includes five CPUs: a main CPU (Central Processing Unit) 4a inside a main control section 4, a scanner CPU 5a for the scan unit 5, a printer CPU 1a for the print unit 1, a panel CPU 9a for the operation panel 9, and a communication control CPU 6a for a communication control section 6.

The main CPU 4a integrally controls the MFP 201. The main control section 4 is provided with a memory section 4b, where information, such as programs controlling the operation of the MFP 201, and image information are stored.

The main CPU 4a performs bidirectional communications via the printer CPU 1a and a common RAM (Random Access Memory). The main CPU 4a outputs operation instructions, and the printer CPU 1a returns the state status. The printer CPU 1a and the scanner CPU 5a send and receive information between the two by serial communications. The printer CPU 1a outputs operation instructions, and the scanner CPU 5a returns the state status.

The operation panel 9 includes the display section 8 having a touch panel, an operation section 10 having various operation keys, and the panel CPU 9a connected to these sections. The panel CPU 9a is connected to the main CPU 4a for the sending and receiving of information with the main CPU 4a.

The communication control CPU 6a is an interface that sends and receives information to and from external devices, specifically, a plurality of PCs (Personal Computers; not illustrated) via a router 50. The main CPU 4a is connected to the communication control CPU 6a, and sends and receives information to and from the external devices. The interconnections, made by wires in this example, are not limited thereto, and wireless interconnections may be made by using electromagnetic waves.

The printer CPU 1a functions to control various sections of the printer 1 by running the control programs stored in a memory (not illustrated). A process control section 30 controls the transport of a recording medium inside the printer 1, and controls image formation in the printer 1. The printer CPU 1a controls the fixing temperature of the fixing device 18.

When entering instructions for image forming operations through the operation panel 9 of the MFP 201, a user performs the setting of tracking information. In response to a user request for the setting of tracking information through the operation panel 9, a tracking information setting screen 50 is displayed in the display section 8.

Figure 7:
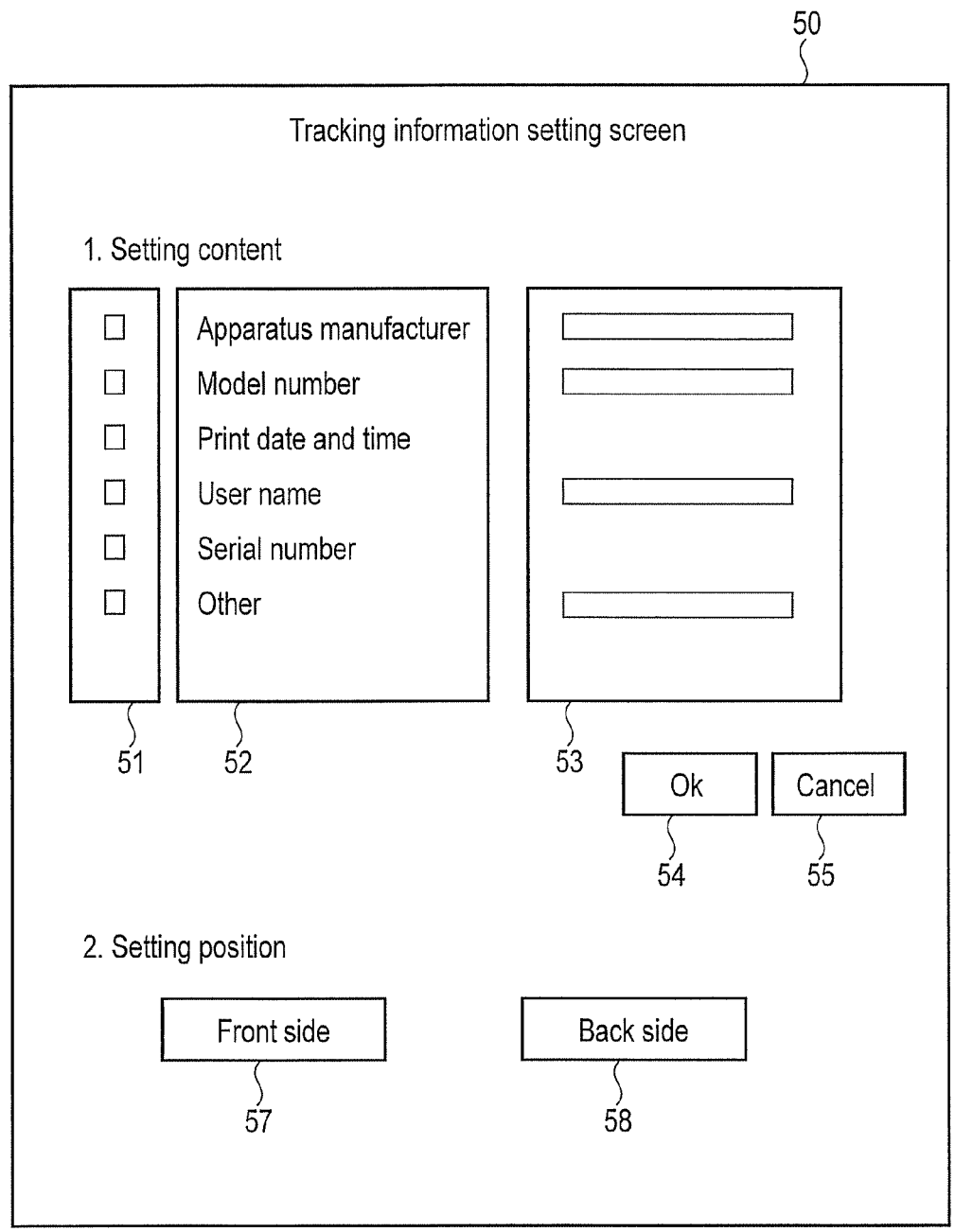
FIG. 7 is an exemplary diagram representing a tracking information setting screen in First Embodiment.

FIG. 7 is an exemplary diagram representing the tracking information setting screen 50 of First Embodiment.

The tracking information setting screen 50 includes a content setting region 50a for setting the content of the tracking information, and a position setting region 50*b* for setting the print position of the tracking information. Inside the content setting region 50*a* are a check box 51, a designation field 52, a data entry field 53, an OK button 54, and a cancel button 55. Inside the position setting region 50*b* are a front-side button 57, and a back-side button 58.

An item to be included in the tracking information is selected by a user from the items displayed in the designation field 52 of the content setting region 50*a*. The item displayed in the designation field 52 includes "Apparatus manufacturer", "Model number", "Print date and time", "User name", "Serial number", and "Other".

"Apparatus manufacturer" indicates the manufacturer of the MFP 201. "Model number" indicates the product number of the MFP 201. "Print date and time" indicates the year, month, date, hour, and minute the print was made. "User name" indicates the name of the user who gave the print instruction. Note that the user name, which is typically the administrator of the MFP 201, may be the name of the user who logined the MFP 201. "Serial number" is given to each page of multiple copies or multiple pages of the prints. For example, a serial number X-Y means page Y of copy X. "Other" indicates the code specified by a user.

A user checking a radio button in the check box 51 selects a corresponding item, which is then included in the tracking information. The user can enter specific data in the data entry field 53 for the predetermined item of the selected items. For example, default data are set for "Apparatus manufacturer", "Model number", and "User name". A user can change these default data.

When a user presses the OK button 54, the item to be included in the tracking information is determined. When a user presses the cancel button 55, the setting of the tracking information is canceled.

After pressing the OK button 54, a user uses the front-side button 57 and the back-side button 58 in the position setting region 50*b* to specify the print position of the tracking information.

Figure 8:
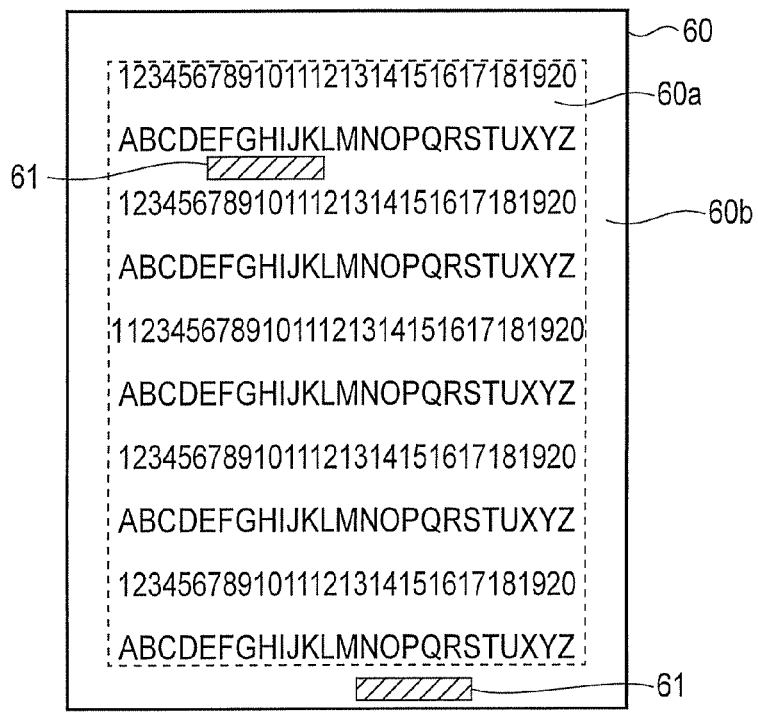
FIG. 8 is an exemplary diagram representing a position setting screen in the image forming apparatus of First Embodiment.

When a user presses the front-side button 57, the position setting screen 60 (FIG. 8) is displayed in the display section 8. In the position setting screen 60, an image region 60*a* and a non-image region 60*b* of a paper are displayed in a manner allowing the user to visually distinguish these regions. The non-image region 60*b* is the region of the whole paper excluding the image region 60*a* set for image printing. A user can specify the print position of the tracking information by moving a tracking information icon 61 displayed in the position setting screen 60 to a desired position.

It should be noted that the position specified in the image region 60*a* is not exact, because the image to be printed is undecided at this point. Specifically, the tracking information is printed based on the print image, after the image is scanned and read. The print position is the region that includes the specified position and the regions around the specified position, and in which the image is not printed. This is because, despite the decolorizable toner, mixing of the decolorizable toner with other toners may occur and deteriorate image quality.

Figure 9:
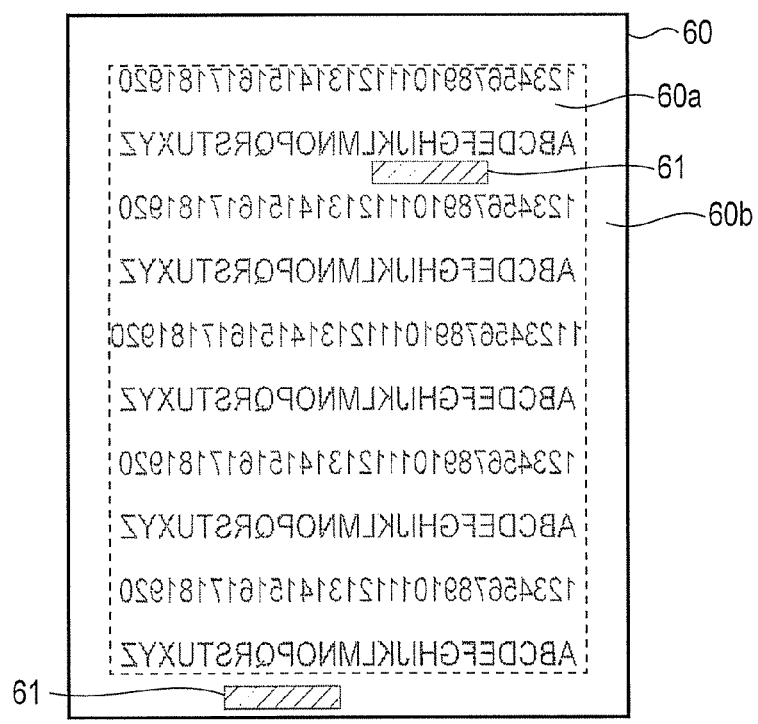
FIG. 9 is an exemplary diagram representing a position setting screen in the image forming apparatus of First Embodiment.

When a user presses the back-side button 58, the position setting screen 60 (FIG. 9) is displayed in the display section 8. In the position setting screen 60, the image region 60*a* and the non-image region 60*b* of a paper are displayed in a manner allowing the user to visually distinguish these regions. A user can specify the print position of the tracking information by moving a tracking information icon 61 displayed in the position setting screen 60 to a desired position.

The position specified in the image region 60*a* is not exact, because the image to be printed is undecided at this point. Specifically, the tracking information is printed based on the print image, after the image is scanned and read. The print position of the tracking information is the region that includes the specified position and the regions around the specified position, and in which the image is not printed. This is because, despite the decolorizable toner printed on the back side, mixing of the decolorizable toner with the toner on the front side may occur and deteriorate image quality.

In one-side printing, the tracking information is printed on either the front side or the back side of a paper. In double-side printing, it is not necessary to print the tracking information on the both sides of a paper, and the tracking information may be printed only on the front side or the back side.

Even though the foregoing embodiment described the electrophotographic image forming apparatus, the invention of the present application is also applicable to inkjet image forming apparatuses. In this case, a liquid ink or a gel ink is used instead of toner, and the fixing temperature may be employed as heating temperature.

Note that the functions described in the embodiment may be realized by hardware, or by using software and causing a computer to read programs implementing these functions. Further, the functions may be realized by appropriately selecting hardware or software.

Further, the functions may be realized by causing a computer to read programs stored in a storage medium (not illustrated). The storage medium used herein may be of any form, as long as it can store programs, and is readable by a computer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus for forming an image on a medium, the apparatus comprising:
 a first image forming material including a color material that is decolored at or above a first temperature, and that develops color at or below a second temperature lower than the first temperature;
 a second image forming material including a color material that is not decolored under heat;
 a controller that performs control to print an image on the medium using the second image forming material, and to print tracking information on the medium using the first image forming material; and
 a heater that heats the medium to the first temperature or higher after an image and the tracking information are formed on the medium.

2. The apparatus according to claim 1, wherein the tracking information includes at least one of apparatus manufacturer, product number, print date, and the name of a user who gave print instructions.

3. The apparatus according to claim 2, further comprising an operation panel that sets the tracking information to be printed.

4. The apparatus according to claim 3, wherein the controller performs control in a manner to print the tracking information in a non-image region on one of a front side and a back side of the medium, the non-image region being the whole region of the medium excluding a region where the image is printed.

5. The apparatus according to claim 4, wherein the operation panel sets a position in the non-image region where the tracking information is printed.

6. The apparatus according to claim 3, wherein the controller performs control in a manner to print the tracking information in a non-image-forming background region in the image region on a front side of the medium, or in a region on a back side of the medium corresponding to the background region.

7. An image forming material for use in an image forming apparatus for forming an image on a medium,
wherein the image forming material comprises a color material that is decolored at or above a first temperature, and that develops color at or below a second temperature lower than the first temperature,
the image forming apparatus including:
the image forming material;
an other image forming material that is not decolored under heat;
a controller that performs control to print an image on the medium using the second image forming material, and to print tracking information on the medium using the image forming material; and
a heater that heats the medium to the first temperature or higher after an image and the tracking information are formed on the medium.

8. The material according to claim 7, wherein the tracking information includes at least one of apparatus manufacturer, product number, print date, and the name of a user who gave print instructions.

9. The material according to claim 8, wherein the apparatus further includes an operation panel that sets the tracking information to be printed.

10. The material according to claim 9, wherein the controller performs control in a manner to print the tracking information in a non-image region on one of a front side and a back side of the medium, the non-image region being the whole region of the medium excluding a region where the image is printed.

11. The material according to claim 10, wherein the operation panel sets a position in the non-image region where the tracking information is printed.

12. The material according to claim 9, wherein the controller performs control in a manner to print the tracking information in a non-image-forming background region in the image region on a front side of the medium, or in a region on a back side of the medium corresponding to the background region.

13. A method comprising:
printing tracking information on the medium with a first image forming material including a color material that is decolored at or above a first temperature, and that develops color at or below a second temperature lower than the first temperature;
printing an image on the medium with a second image forming material including a color material that is not decolored under heat;
heating the medium to the first temperature or higher after the image and the tracking information are formed on the medium; and
cooling the medium below the second temperature to visualize the tracking information.

14. The method according to claim 13, wherein the tracking information includes at least one of apparatus manufacturer, product number, print date, and the name of a user who gave print instructions.

15. The method according to claim 14, wherein the tracking information to be printed is set using an operation panel.

16. The method according to claim 15, wherein the printing tracking information comprises printing tracking information in a non-image region on one of a front side and a back side of the medium, the non-image region being the whole region of the medium excluding a region where the image is printed.

17. The method according to claim 16, wherein the operation panel is used to specify a position in the non-image region where the tracking information is printed.

18. The method according to claim 15, wherein the printing tracking information comprises printing tracking information in a non-image-forming background region in the image region on a front side of the medium, or in a region on a back side of the medium corresponding to the background region.

19. An image forming method for an image forming apparatus that forms an image on a medium, the method comprising:
printing tracking information on the medium with a first image forming material including a color material that is decolored at or above a firs t temperature, and that develops color at or below a second temperature lower than the first temperature;
printing an image on the medium with a second image forming material including a color material that is not decolored under heat; and
heating the medium to the first temperature or higher after the image and the tracking information are formed on the medium.

* * * * *